(12) United States Patent
Zakharov et al.

(10) Patent No.: US 9,250,839 B1
(45) Date of Patent: Feb. 2, 2016

(54) PRINTING SYSTEM FOR DATA HANDLING HAVING A PRIMARY SERVER FOR STORING ACTIVE AND PASSIVE DATA AND A SECOND SERVER FOR STORING NORMALIZED AND ANALYTICAL DATA

(71) Applicant: KYOCERA Document Solutions Inc., Osaka (JP)

(72) Inventors: Oleg Zakharov, Concord, CA (US); Kiran Shakya, Concord, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/529,406

(22) Filed: Oct. 31, 2014

(51) Int. Cl.
*G06F 3/12* (2006.01)
*G06K 15/00* (2006.01)

(52) U.S. Cl.
CPC ............ *G06F 3/1224* (2013.01); *G06F 3/1203* (2013.01)

(58) Field of Classification Search
CPC . G06F 3/1224; G06F 3/1203; G06Q 30/0283; G06Q 10/06
USPC ............... 358/1.1, 1.9, 1.13, 1.14, 1.15, 1.16, 358/402; 709/203, 220, 223; 705/400; 715/733, 760, 762
See application file for complete search history.

(56) References Cited

U.S. PATENT DOCUMENTS

| 6,449,688 | B1* | 9/2002 | Peters | G06F 11/1076 348/E5.008 |
| 8,402,373 | B2 | 3/2013 | Ferlitsch | |
| 2005/0071391 | A1* | 3/2005 | Fuerderer | G06F 17/30 |
| 2008/0189350 | A1* | 8/2008 | Vasa | H04L 12/2602 709/201 |
| 2009/0313503 | A1* | 12/2009 | Atluri | G06F 11/1453 714/19 |
| 2012/0059773 | A1 | 3/2012 | Jones et al. | |
| 2014/0173196 | A1* | 6/2014 | Beveridge | G06F 3/0689 711/114 |

* cited by examiner

*Primary Examiner* — Gabriel Garcia
(74) *Attorney, Agent, or Firm* — McDonnell Boehnen Hulbert & Berghoff LLP (57) ABSTRACT

Example systems and related methods may relate to handling a plurality of data transmissions from printing devices. Namely, a system may include a primary server and a secondary server. The primary server may include a primary processor and a primary storage device. The secondary server may include a secondary processor and a secondary storage device. The primary processor may be configured to receive and store a plurality of data transmissions from a corresponding plurality of printing devices. The data transmissions may be stored in an active database associated with the primary storage device. Metadata corresponding to the data transmissions may be generated. Some or all of the data transmissions may be archived as secondary data at a secondary server. The secondary data may be pre-processed to form a normalized database. In some embodiments, the metadata and/or the normalized data may be subject to search queries or statistical analysis.

20 Claims, 11 Drawing Sheets

PRINTING SYSTEM FOR DATA HANDLING HAVING A PRIMARY SERVER FOR STORING ACTIVE AND PASSIVE DATA AND A SECOND SERVER FOR STORING NORMALIZED AND ANALYTICAL DATA

BACKGROUND

Printing devices have increased in number and geographic footprint throughout the world and have become increasingly connected to networks. Printing device vendors and service personnel may receive data transmissions related to, among other information, the status of such devices. Information about these devices may be collected for the purpose of maintenance, troubleshooting, and diagnostics.

However, as the sheer number of network-connected printing devices grows, handling of data transmission volume and message content may become increasingly difficult. Thus, a need exists for a more efficient system and method for handling large volumes of data transmissions from printing devices.

SUMMARY

In a first aspect, a method is provided. The method includes receiving, at a primary server, a plurality of data transmissions from a corresponding plurality of printing devices. The plurality of data transmissions includes respective data transmissions. Each respective data transmission is formatted according to an original format and each respective data transmission includes a respective device identifier. The method includes storing the respective data transmissions in an active database associated with the primary server. Storing the respective data transmissions includes storing the respective data transmissions in the respective original formats. The method also includes determining archive-ready data from the stored data transmissions based on a timestamp being beyond a threshold. The method additionally includes storing the archive-ready data as accumulated archive data in a passive archive associated with the primary server. The method yet further includes determining secondary-ready data from the accumulated archive data based on a size of the accumulated archive data. The method also includes transferring the secondary-ready data from the primary server to a secondary server. The method additionally includes storing the secondary-ready data as secondary data in a second archive associated with the secondary server. The method further includes pre-processing the secondary data. Pre-processing the secondary data includes grouping the secondary data into sections based at least on a respective printing device property of the respective data transmissions of the secondary data. Pre-processing the secondary data further includes forming a normalized database. The normalized database includes sections organized based at least on the respective device identifiers of the respective data transmissions of the secondary data.

In a second aspect, a method is provided. The method includes receiving, at a primary server, a plurality of data transmissions from a corresponding plurality of printing devices. The plurality of data transmissions includes respective data transmissions. Each respective data transmission is formatted according to an original format and includes a respective device identifier. The method also includes storing the respective data transmissions in an active database associated with the primary server. Storing the respective data transmissions includes storing the respective data transmissions in the respective original formats and storing primary metadata based on the stored data transmissions. The method additionally includes receiving, at the primary server, a repair query. The repair query includes at least one search criteria based on the primary metadata. The method yet further includes determining a query response. The query response includes respective data transmissions from the stored data transmissions that correspond to the at least one search criteria. The method also includes transmitting the query response and determining archive-ready data from the stored data transmissions based on a timestamp being beyond a threshold. The method additionally includes storing the archive-ready data as accumulated archive data in a passive archive associated with the primary server. The method further includes determining secondary-ready data from the accumulated archive data based on a size of the accumulated archive data. The method yet further includes transferring the secondary-ready data from the primary server to a secondary server. The method also includes storing the secondary-ready data as secondary data in a second archive associated with the secondary server and pre-processing the secondary data. Pre-processing the secondary data includes grouping the secondary data into sections based at least on a respective printing device property of the respective data transmissions of the secondary data. Pre-processing the secondary data further includes forming a normalized database. The normalized database includes the sections organized based at least on the respective device identifiers of the respective data transmissions of the secondary data. The method further includes performing a statistical analysis on the normalized database based on at least one section.

In a third aspect, a system is provided. The system includes a primary server and a secondary server. The primary server includes a primary processor and a primary storage device. The secondary server includes a secondary processor and a secondary storage device. The primary processor is configured to receive a plurality of data transmissions from a corresponding plurality of printing devices. The plurality of data transmissions includes respective data transmissions. Each respective data transmission is formatted according to an original format and each respective data transmission includes a respective device identifier. The primary processor is also configured to store the respective data transmissions in an active database associated with the primary storage device. Storing the respective data transmissions includes storing the respective data transmissions in the respective original formats. The primary processor is further configured to store primary metadata based on the stored data transmissions. The primary metadata includes respective file names and respective file locations of the respective data transmissions within the stored data transmissions. The primary processor is yet further configured to determine archive-ready data from the stored data transmissions based on a timestamp being beyond a threshold. The primary processor is additionally configured to store the archive-ready as accumulated archive data in a passive archive associated with the primary storage device. The primary processor is also configured to determine secondary-ready data from the accumulated archive data based on a size of the accumulated archive data. The primary processor is further configured to transfer the secondary-ready data from the first server to a secondary server. The secondary processor is configured to store the secondary-ready data as secondary data in a second archive associated with a secondary storage device. The secondary processor is also configured to pre-process the secondary data. Pre-processing the secondary data includes grouping the secondary data into sections based at least on a respective printing device property of the respective data transmissions of the secondary data.

Pre-processing the secondary data also includes forming a normalized database. The normalized database includes the sections organized based at least on the respective device identifiers of the respective data transmissions of the secondary data.

Other aspects, embodiments, and implementations will become apparent to those of ordinary skill in the art by reading the following detailed description, with reference where appropriate to the accompanying drawings.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

In an effort to collect as much data as possible from remotely-connected devices, a server may store and/or archive data transmissions received from the remote devices. The remote devices may send the data transmissions at predetermined intervals and/or in response to various conditions. For example, the remote devices may send daily page counter information. Additionally, the remote devices may transmit data (e.g. an alert) in response to some event or condition of the remote device. The stored data transmissions may be used for maintenance and troubleshooting, among other purposes.

The size of data collected on the server could grow significantly depending on the number of remotely-connected devices and the data collection time. For instance, if 10,000 remote devices each transmit 1 kilobyte of data every day and data is collected for several months, the total size of the collected data may grow to more than several gigabytes.

Furthermore, not all data collected by the server contains valuable information. As an example, most of the collected data may include highly redundant information. Specifically, when the same device submits daily reports, most parts of the reports will remain similar or identical because most of the device's properties are the same. Thus, collecting large numbers of data transmissions from remote devices over a long period of time leads to a high level of data redundancy.

The remote devices may use web services to submit data to the server via an HTTP protocol. The format of data may vary for each type of data transmission and may further vary by device model. For example, devices may submit data in an XML message format or a file (text and/or image) format. When received at the server, some data from the XML messages may be parsed and stored in a database table. Thus, after receiving and storing data, data collected at the server may include data in a flat file format, an XML message format, and a database table.

When the server has stored large amounts of data, the performance of the server may be dramatically affected. Preferably, receiving and storing data should be performed using a very fast transaction; otherwise, a server cannot support a large number of remotely-connected devices. For example, when new information needs to be added to a database table, the whole database table may need to be placed in memory. However, if a database table becomes too large, and database transactions involve swapping data between memory and a hard drive, for instance, the transaction may become much slower. Therefore, archiving and reformatting the data transactions before the database tables become too large may offer benefits with respect to optimizing server and database performance.

This disclosure may relate to systems and methods for receiving, storing, organizing, and searching a large volume of data transmissions from printing devices. As an example, each of ten thousand printing devices may send ten data transmissions per day to a server. In such a scenario, the server may receive hundreds of thousands of data transmissions each day. Using a single server to handle the data transmission load may be impractical or inefficient. However, by using two servers, more efficient data handling may result.

Specifically, a system may include a primary server and a secondary server. The primary server may include a primary storage device and a primary processor. The primary processor may be configured to receive a plurality of data transmissions from a corresponding plurality of printing devices.

The primary server may generally be used for short-term device troubleshooting. That is, technical support may access and/or search data transmissions from the primary server. Such data transmissions may have been recently received from the printing device in an original format. Using data transmissions obtained from the primary server may offer several benefits to service personnel, in part due to redundancy provided by the original data format and timeliness (the most recent data transmissions reflect the most current status and/or data from the printing device).

Due to the large volume of incoming data transmissions, a disk capacity and/or a memory capacity of the primary server may become utilized in full or in large part within a relatively short amount of time. As a result, software applications running on the primary server may be limited in their ability to organize, manipulate, and/or search the stored data transmissions. In other words, the large number of incoming data transmissions may put a strain on the finite disk and memory resources associated with the primary server.

Accordingly, a secondary server may be used to conduct data processing tasks. For example, the secondary server may reduce redundancy inherent in the data transmissions. Specifically, the secondary server may transfer stored data transmissions from the primary server and reformat the information into a normalized database so as to reduce file redundancy and/or file size. The secondary server may then store the reformatted information in long-term storage.

The secondary server may also be used for long-term/historical data analysis. For example, such analysis may identify common issues by printing device type or changes in performance trends based on an implementation of new hardware. Other long-term data analysis may be conducted.

The plurality of data transmissions includes respective data transmissions, which are formatted according to an original format. The respective data transmissions may include information about the respective printing device. The information may include files, messages, and/or data in varying original formats. Each respective data transmission may have a different original format. For example, respective data transmissions may be originally formatted as plain text, image files, comma separated value, among other formats.

Data transmissions may be sent from the printing devices based on a state of the respective printing device, an occurrence, or on a periodic basis. For example, each respective data transmission may include a respective device identifier and a respective printing device property. Other information about the respective printing device and/or the data transmission itself may be included in the data transmission. For example, the data transmission may include an image, text, and/or an XML message. In an example embodiment, the respective data transmission may have a file size of 1 kilobyte or more. Furthermore, the data transmission may include a timestamp, a device model, a device identifier, and/or other information about the respective printing device or its condition. The timestamp may include, for example, information indicative of a time at which the data transmission is transmitted, received, and/or stored. Other types of timestamps are possible.

The primary processor may be configured to store the respective data transmissions in their respective original formats in an active database. The active database may be associated with the primary storage device. The primary processor may also be configured to store primary metadata based on the stored data transmissions. The primary metadata may include respective file names and respective file locations of the respective data transmissions within the stored data transmissions. The primary metadata may additionally or alternatively include other information.

The primary processor may be further configured to determine archive-ready data from the stored data transmissions based on a timestamp being beyond a threshold. The archive-ready data may be stored as accumulated archive data by the primary processor. The accumulated archive data may be stored in a passive archive associated with the primary storage device. The primary processor may also be configured to determine secondary-ready data from the accumulated archive data based on a size of the accumulated archive data. The primary processor may be additionally configured to transfer the secondary-ready data from the first server to a secondary server.

The secondary processor may be configured to store the secondary-ready data as secondary data. The secondary data may be stored in a second archive associated with the secondary server. The secondary processor may also be configured to pre-process the secondary data. Pre-processing the secondary data includes grouping the secondary data into sections based at least on a respective printing device property of the respective data transmissions of the secondary data. Pre-processing the secondary data further includes forming a normalized database. The normalized database includes the sections organized based at least on the respective device models and the respective device identifiers of the respective data transmissions of the secondary data.

II. System Examples

Figure 1A:
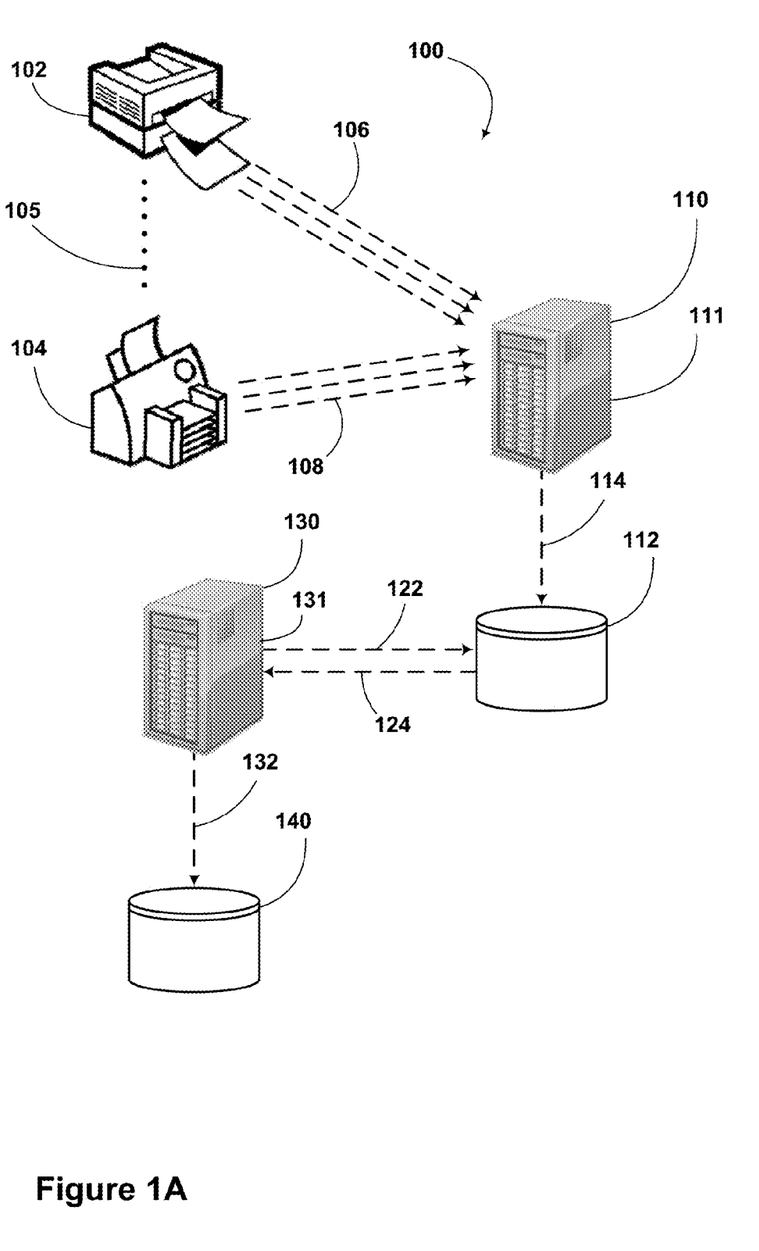
FIG. 1A is a schematic block diagram illustrating a system, according to an example embodiment.

FIG. 1A is a schematic block diagram illustrating a system 100, according to an example embodiment. The system 100 may include a first printing device 102, a second printing device 104, and a further plurality of printing devices 105. The system 100 may also include a primary server 110, a primary storage device 112, a secondary server 130, and a secondary storage device 140. In an example embodiment, the first printing device 102, second printing device 104, and the further plurality of printing devices 105 may represent thousands of devices connected to the primary server 110 through one or more, possibly different, network protocols.

The first printing device 102 and/or the second printing device 104 and/or any of the plurality of printing devices 105 may send data transmissions 106 and 108 to the primary server 110. In an example embodiment, thousands of devices may each transmit several data transmissions per day. Thus, the primary server 110 may receive thousands, tens of thousands, or hundreds of thousands of data transmissions per day, or more. Accordingly, the primary server 110 may process between 500 megabytes to 2 gigabytes of data related to the data transmissions per day, or more.

Respective data transmissions may be transferred over wired or wireless links between the primary server 110 and the printing devices. The primary server 110 may be operable to transfer the respective data transmissions from any of the connected printing devices to the primary storage device 112 via a primary server link 114. The primary server 110 may include one or more primary processors 111. Additionally or alternatively, the primary server 110 may be one or more computers. In an example embodiment, the one or more primary processors 111 may be associated and/or collocated with the primary server 110. In another embodiment, the primary processor 111 may include a remote or distributed computing system and/or a cloud-based computing system.

The secondary server 130 may be operable to transfer respective data transmissions and/or metadata associated with respective data transmissions both to and from the primary storage device 112 via a secondary-to-primary link 122 and a primary-to-secondary link 124. The secondary server 130 may include one or more secondary processors 131. The secondary server 130 may be further operable to transfer respective data transmissions and/or metadata associated with the respective data transmissions to the secondary storage device 140 via a secondary server link 132. Additionally or alternatively, the secondary server 130 may be one or more computers. In some embodiments, the secondary server 130 may be a distributed network of computers or a cloud-based computing system.

The primary server 110 and the secondary server 130 and their respective processors 111 and 131 may be configured to carry out instructions. The instructions may relate to various manipulations of data, including storing, accessing, transferring, analyzing, or otherwise manipulating the respective data transmissions from any of the related printing devices.

In an example embodiment, the primary processor 111 may be configured to receive the plurality of data transmissions from the printing devices. Each respective data transmission of the plurality of data transmissions may be formatted according to an original format. The original format of each respective data transmission may include one or more of a variety of different formats including: text formats, image formats, extensible mark-up language (XML), database tables, or another original or flat file format.

Each respective data transmission may include a respective device identifier. In an example embodiment, the respective device identifier may identify the particular printing device from which the data transmission originated. The respective data transmission may alternatively or additionally include more or less information.

The primary processor 111 may also be configured to store the respective data transmissions in an active database associated with the primary storage device 112. The active database may be a Structured Queried Language (SQL) or other relational database. The active database may additionally or alternatively be a different type of database.

The primary processor 111 may also be configured to store primary metadata based on the stored data transmissions. For example, the primary metadata may include respective file names and respective file locations of the respective data transmissions within the stored data transmissions. The primary metadata may be stored at the primary storage device 112. Alternatively, the primary metadata may be stored elsewhere, such as at the secondary storage device 140. Other storage locations for the primary metadata are possible.

The primary processor 111 may be configured to determine archive-ready data from the stored data transmissions based on a timestamp being beyond a threshold. For example, the primary processor 111 may periodically or continually determine archive-ready data based on an age of a given respective data transmission. The primary processor 111 may be configured to store the archive-ready data as accumulated archive data in a passive archive associated with the primary storage device 112. That is, the passive archive may represent a temporary repository for data transmissions that are older than a given date and/or time.

In an example embodiment, alert messages from printing devices sent several days prior may be less valuable for immediate troubleshooting, which may normally require the most recent information about a printing device. These aging reports may be moved to the passive archive.

The primary processor 111 may be further configured to determine secondary-ready data from the accumulated archive data based on a size of the accumulated archive data. In other words, the primary processor 111 may wait while the size of the accumulated archive data increases to a given target size. Once the archive data reaches the given target size, the primary processor 111 may select or otherwise designate secondary-ready data from the accumulated archive data.

The primary processor 111 may additionally be configured to transfer the secondary-ready data from the first server 110 to the secondary server 130. Transferring the secondary-ready data between the servers may include transferring the data via various protocols including file transfer protocol (FTP), SFP, SSH, or other protocols. The transfer protocol may alternatively include a share folder or file queueing method. In some embodiments, the secondary-ready data may be compressed before and/or during transfer to the secondary server 130.

The secondary processor 131 may be configured to store the secondary-ready data as secondary data in a second archive. The second archive may be associated with the secondary storage device 140. In some embodiments, the secondary processor 131 may store the secondary-ready data in a compressed format. Alternatively, the secondary processor 131 may store the secondary data in an uncompressed format.

The secondary processor 131 may be further configured to pre-process the secondary data. Pre-processing the secondary data may relate to various steps or actions. For example, the secondary data, or a subset of the secondary data, may be grouped into sections based at least on a respective printing device property of the respective data transmissions of the secondary data. Respective printing device properties may include a particular information field or data element. Pre-processing may include processing the respective data transmissions of secondary data into a unified format or organization.

In an example embodiment, the secondary data may be grouped according to a device model, device identifier, timestamp, or another set of information present within the secondary data. The sections may represent columns of data in a spreadsheet-type database. Alternatively, the sections may represent relationships or data types in a relational database. Other methods of organizing the information so as to improve efficient search, storage, and/or utility of the secondary data will be obvious to one of ordinary skill in the art. Such other methods are also contemplated within the scope of the present disclosure.

Pre-processing the secondary data may further include forming a normalized database. The normalized database includes the sections organized based at least on the respective device identifiers of the respective data transmissions of the secondary data. The normalized database may be formatted as a relational database, such as an SQL database. Other ways of formatting or arranging the database are possible and contemplated herein.

Figure 1B:
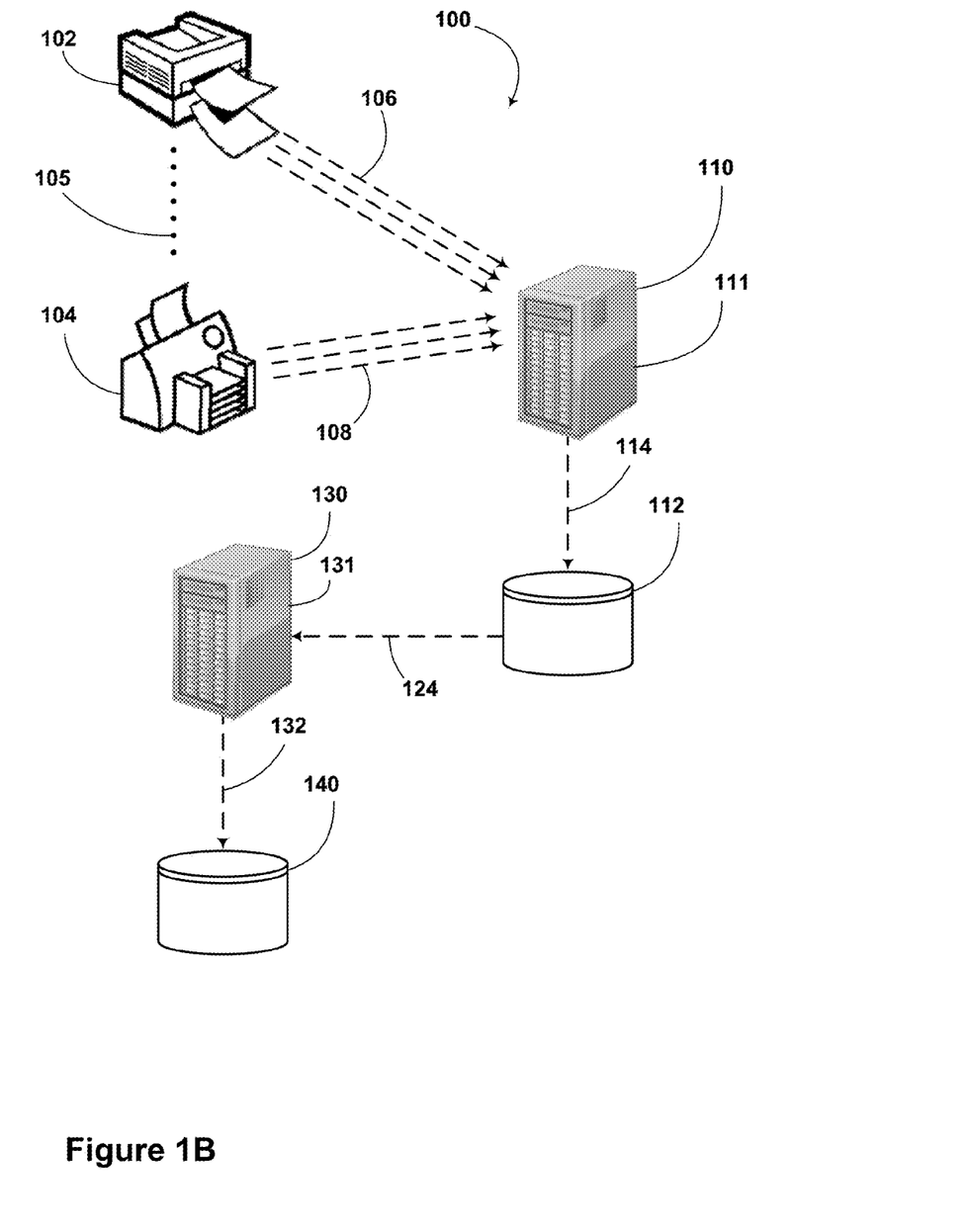
FIG. 1B is a schematic block diagram illustrating a system, according to an example embodiment.

FIG. 1B is a schematic block diagram illustrating a system 100, according to an example embodiment. In such an embodiment, the secondary server 130 may be operable to transfer respective data transmissions and/or metadata associated with respective data transmissions from the primary storage device 112 via the primary-to-secondary link 124.

Figure 1C:
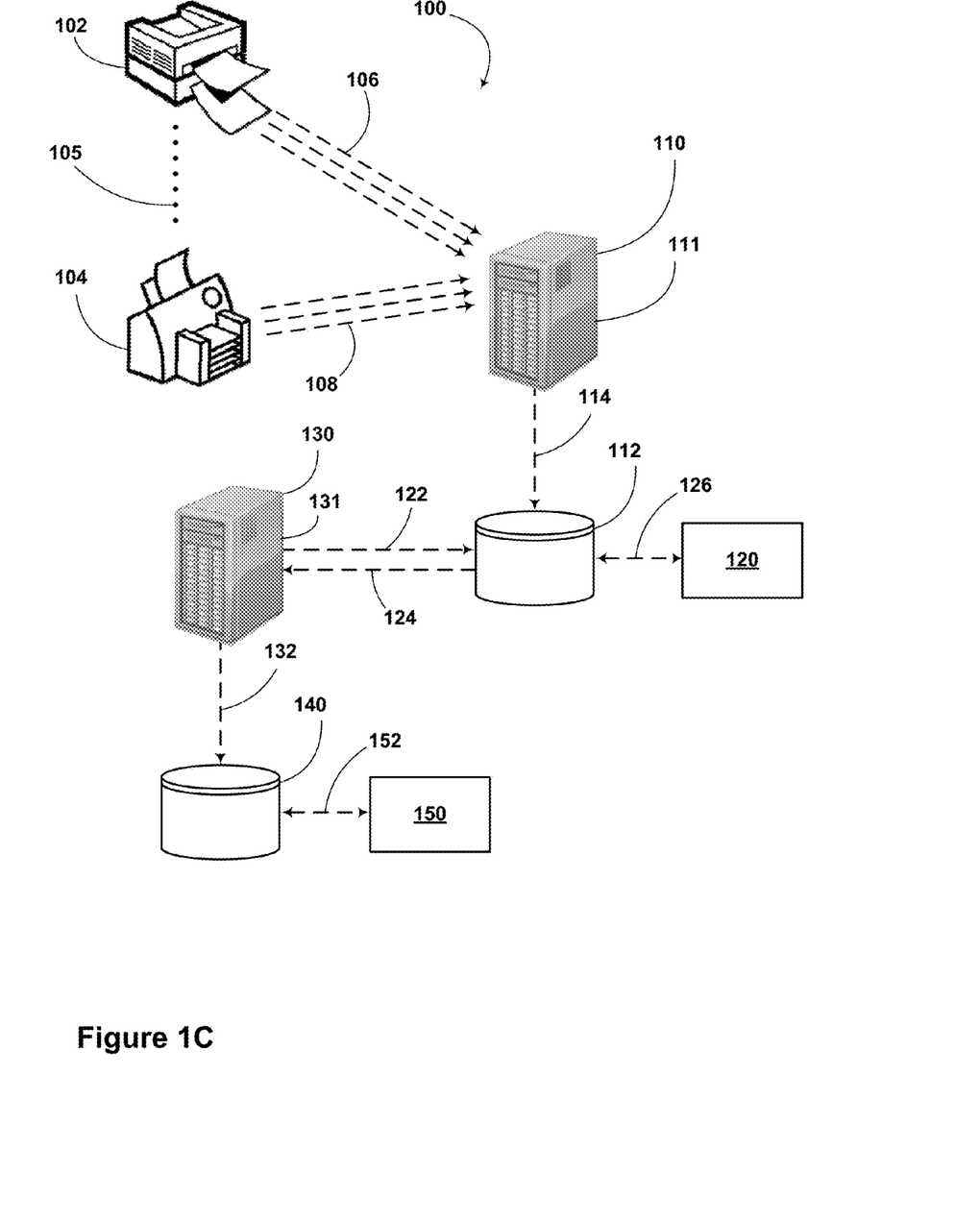
FIG. 1C is a schematic block diagram illustrating a system, according to an example embodiment.

FIG. 1C is a schematic block diagram illustrating a system 100, according to an example embodiment. In such an embodiment, a user may be able to interact with data transmissions stored on the primary storage device 112. For example, a user interface 120 may be communicatively coupled to the primary storage device 112 via a user interface link 126. In an example embodiment, using the user interface 120, a user may query, search, view, or otherwise interact with the respective data transmissions making up the data stored on the primary storage device 112. In such an embodiment, the respective data transmissions may be viewed, searched, stored, or otherwise manipulated in their original format. In response to such a query, search, or user interaction, the primary server 110 may transmit a response via the user interface 120. Other types of responses are possible. For example, the user interaction via the user interface may include commands to manipulate, transfer, and/or delete various data transmissions stored on the primary storage device 112. The user interface may include a direct terminal access, a web server/client, or another type of user interface.

Figure 2:
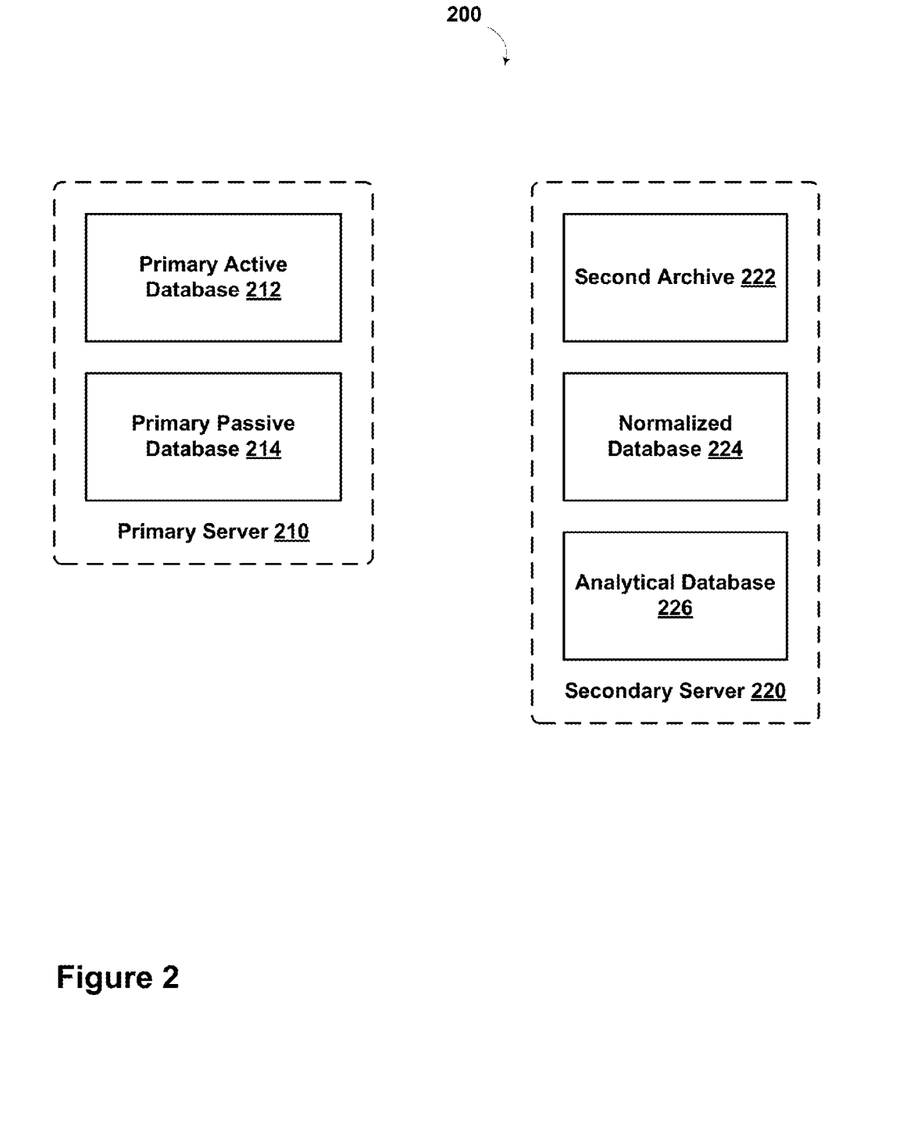
FIG. 2 is a schematic block diagram illustrating a server system, according to an example embodiment.

FIG. 2 is a schematic block diagram illustrating a server system 200, according to an example embodiment. The server system 200 may include a primary server 210 and a secondary server 220. The primary server 210 may include a processor, memory, operating system, and application(s) allowing it to access and administer a primary active database 212 and a primary passive database 214. In an example embodiment, the primary server 210 may receive a plurality of data transmissions from a plurality of printing devices. After receiving the data transmissions, the respective data transmissions may be stored in the primary active database 212. The primary active database 212 may store the respective data transmissions in their respective original formats.

Data transmissions stored in the primary active database 212 may be determined to be archive-ready. For example, respective data transmissions may be associated with a timestamp that is beyond a predetermined threshold. In an example embodiment, the timestamp may be included within the respective data transmission. In other embodiments, the timestamp may be associated with the respective data transmission upon storing it in the primary active database 212. Subsequent to determining the archive-ready data, the archive-ready data may be stored as accumulated archive data at the primary passive database 214. In other words, as archive-ready data is determined and stored, the amount of data may build up in the primary passive database 214.

The secondary server 220 may include a processor, memory, operating system, and application(s) allowing it to access and administer a second archive 222, a normalized database 224, and an analytical database 226. As a size of the accumulated archive data at the primary passive database 214 reaches a predetermined threshold, the accumulated archive data may be determined to be secondary-ready data. The secondary-ready data may be transferred from the primary server 210 to the secondary server 220 and stored at the second archive 222 as secondary data.

The secondary data may be pre-processed in various ways. For example, the secondary data may be grouped or organized into sections based on the information included in the respective data transmissions of the secondary data. In an example embodiment, the secondary data may be grouped based on a printing device property of the respective data transmissions of the secondary data. Furthermore, the normalized database 224 may be formed based on the sections or groups of the respective data transmissions of the secondary data. For example, the normalized database 224 may be organized according to printing device model and/or respective printing device identifiers of the respective data transmissions of the secondary data. Additionally or alternatively, the normalized database 224 may be organized according to other information from the respective data transmissions of the secondary data.

In some embodiments, a statistical analysis may be conducted using the secondary data. In such scenarios, one or more results of the statistical analysis may be stored in the analytical database 226. Additionally or alternatively, the analytical database 226 may include other information about the secondary data. The other information may generally relate to the secondary data, e.g. total number of data transmissions, number of data transmissions of a given type, number of data transmissions regarding a given issue, etc. The other information in the analytical database 226 may optionally include information about respective data transmissions in the secondary data.

III. Method Examples

FIGS. 3A-D illustrate methods, according to one or more embodiments. The methods include blocks that may be carried out in any order. Furthermore, various blocks may be added to or subtracted from the described methods within the intended scope of this disclosure. The methods may correspond to steps that may be carried out using some or all of the elements of system 100 or system 200, as illustrated and described in reference to FIGS. 1A-C and FIG. 2.

Figure 3A:
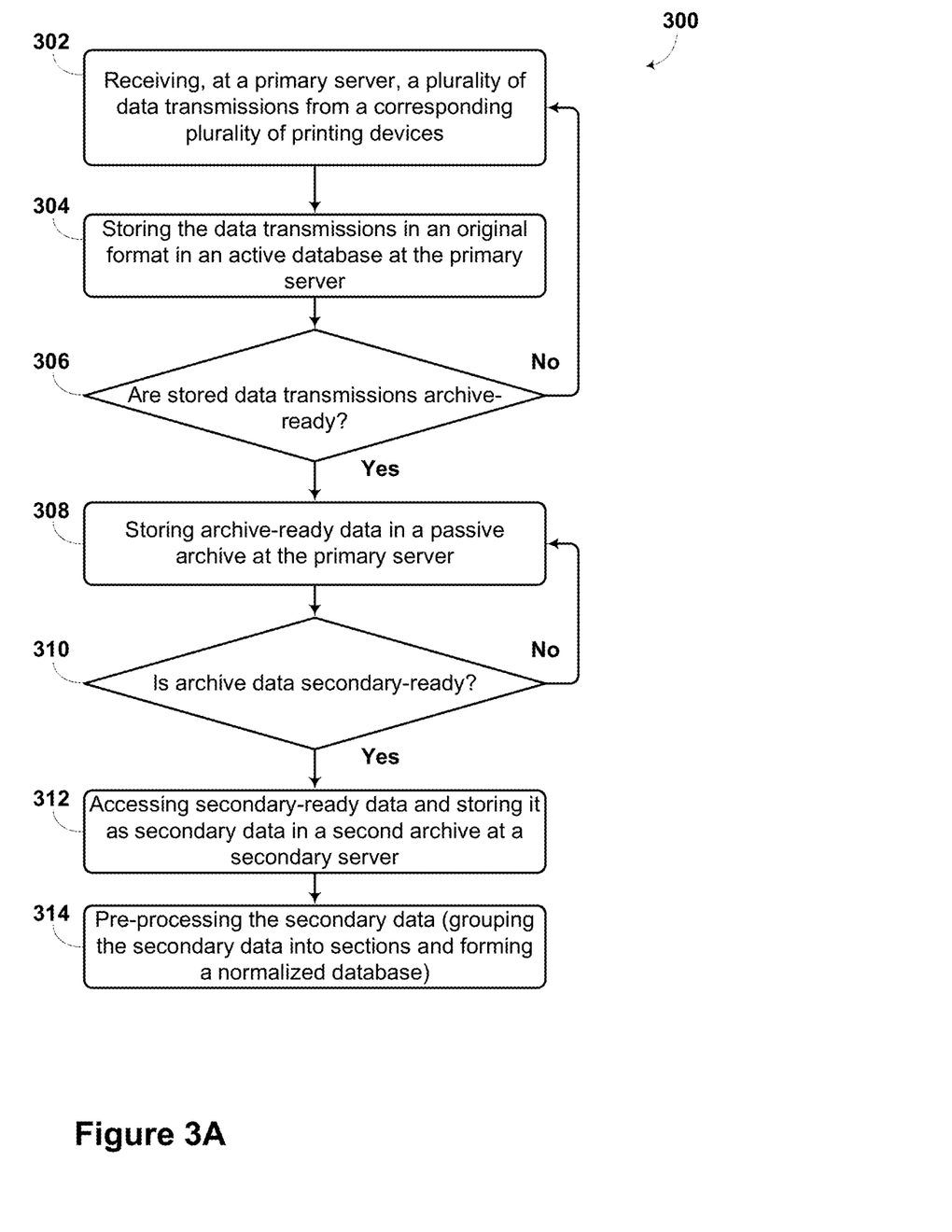
FIG. 3A is a flow diagram illustrating a method, according to an example embodiment.

FIG. 3A is a flow diagram illustrating a method 300, according to an example embodiment. Block 302 includes receiving, at a primary server, a plurality of data transmissions from a corresponding plurality of printing devices. Block 304 includes storing data transmissions in an active database at the primary server in an original format. Block 306 includes determining archive-ready data from the stored data transmissions. If the stored data transmissions are not determined to be archive-ready, the method 300 includes receiving further data transmissions at Block 302. If the stored data transmissions are determined to be archive-ready, Block 308 includes storing the archive-ready data in a passive archive at the primary server as archive data. In some embodiments, an archiving (purging) script may be run on a daily basis and move data from active table to archives in an incremental manner.

Block 310 includes determining secondary-ready data from the archive data. If the archive data is not determined to be secondary-ready data, the method 300 includes storing further archive-ready data in the passive archive at the primary server. If the archive data is determined to be secondary-ready data, Block 312 includes accessing the secondary-ready data and storing it as secondary data in a second archive at a secondary server.

Block 314 includes pre-processing the secondary data. Such pre-processing may include grouping or organizing the secondary data into sections. The sections may form a normalized database associated with the secondary server.

Figure 3B:
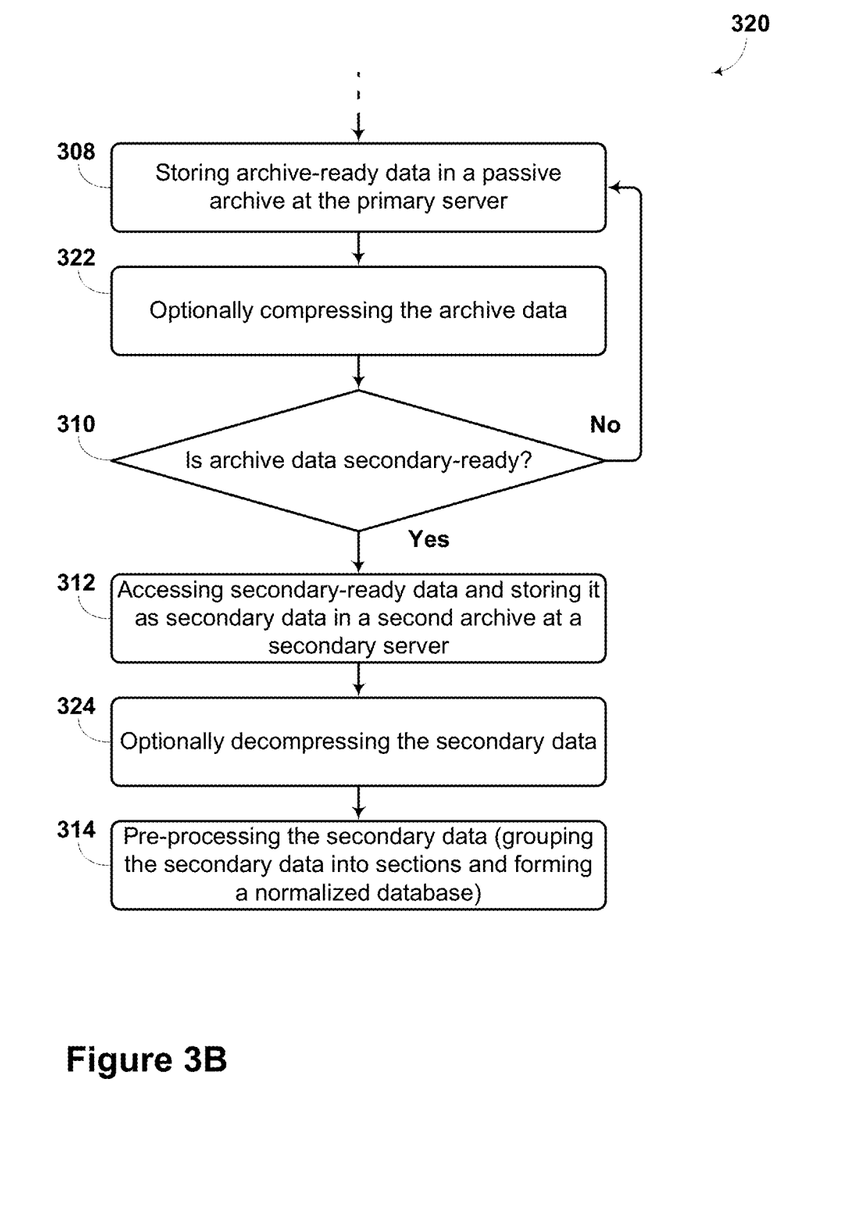
FIG. 3B is a flow diagram illustrating a method, according to an example embodiment.

FIG. 3B is a flow diagram illustrating a method 320, according to an example embodiment. Method 320 may be similar or identical to method 300 in some respects. Block 322 includes optionally compressing the archive data. Although method 320 illustrates compressing the archive data after storing archive-ready data in the passive archive at the primary server, the compressing may occur at any point during the method 320. Additionally, Block 324 includes optionally decompressing the secondary data. Although method 320 illustrates decompressing the secondary data after it is stored at the second archive at the secondary server, the decompressing may occur in a different order.

Figure 3C:
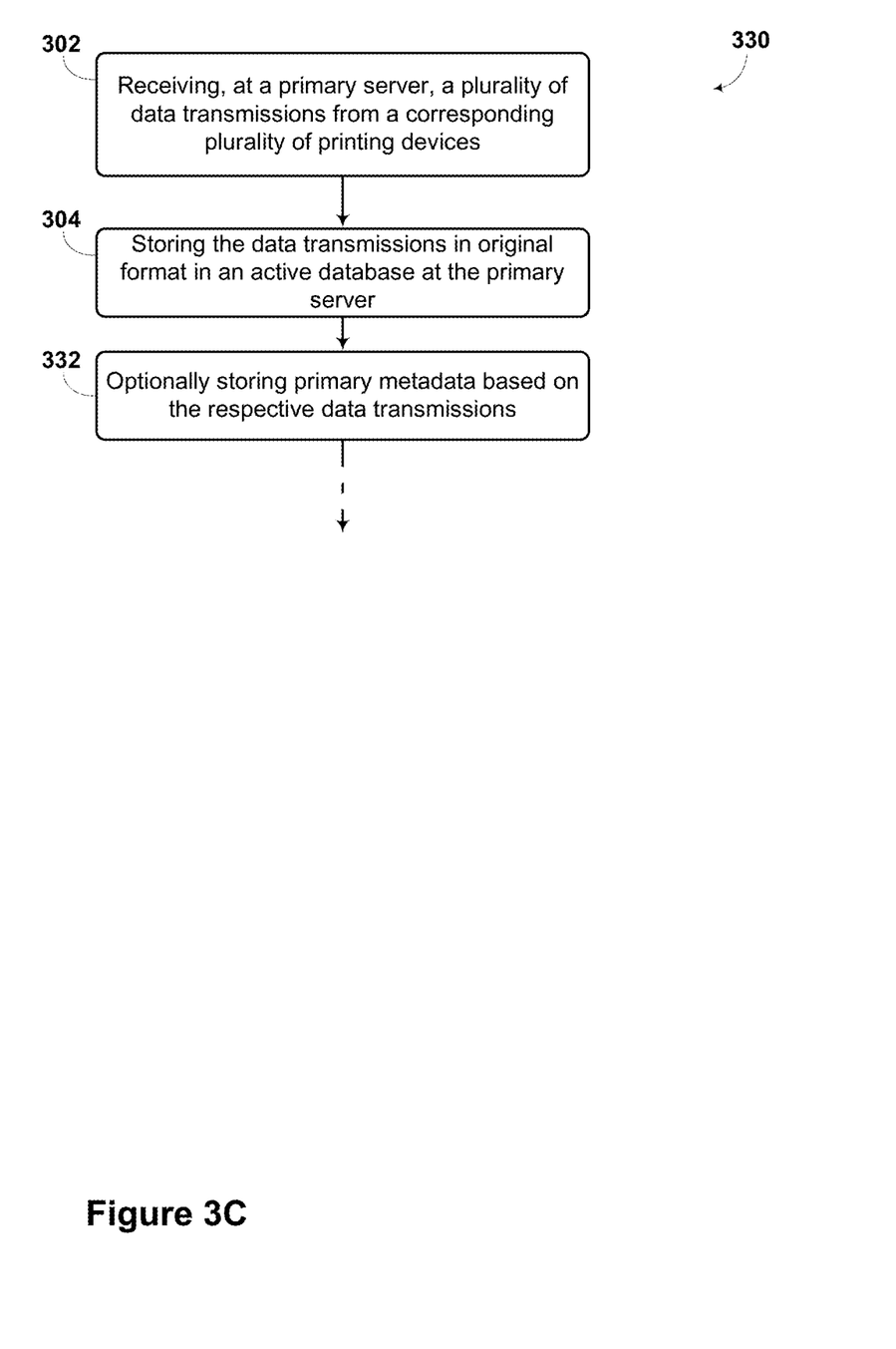
FIG. 3C is a flow diagram illustrating a method, according to an example embodiment.

FIG. 3C is a flow diagram illustrating a method 330, according to an example embodiment. FIG. 3C illustrates a method 330, according to an example embodiment. Method 330 may be similar or identical to method 300 or method 320 in some respects. Block 332 includes optionally storing primary metadata based on the respective data transmissions. The primary metadata may relate to various aspects about the respective data transmissions. For example, the primary metadata may include file names and file locations of the respective data transmissions. The file names and file locations of the respective data transmissions may include pointers and/or links to files corresponding to the actual respective data transmissions. In some embodiments, the primary metadata may be stored so as to effectuate efficient file access to the respective data transmissions.

The primary metadata may be used to make various determinations in the aforementioned methods. For example, the primary metadata may provide a basis for determining archive-ready data, secondary-ready data, or a query response.

In an example embodiment, metadata may alternatively be generated in association with pre-processing the data transmissions. Specifically, metadata may be generated so as to index the respective data transmissions.

Figure 3D:
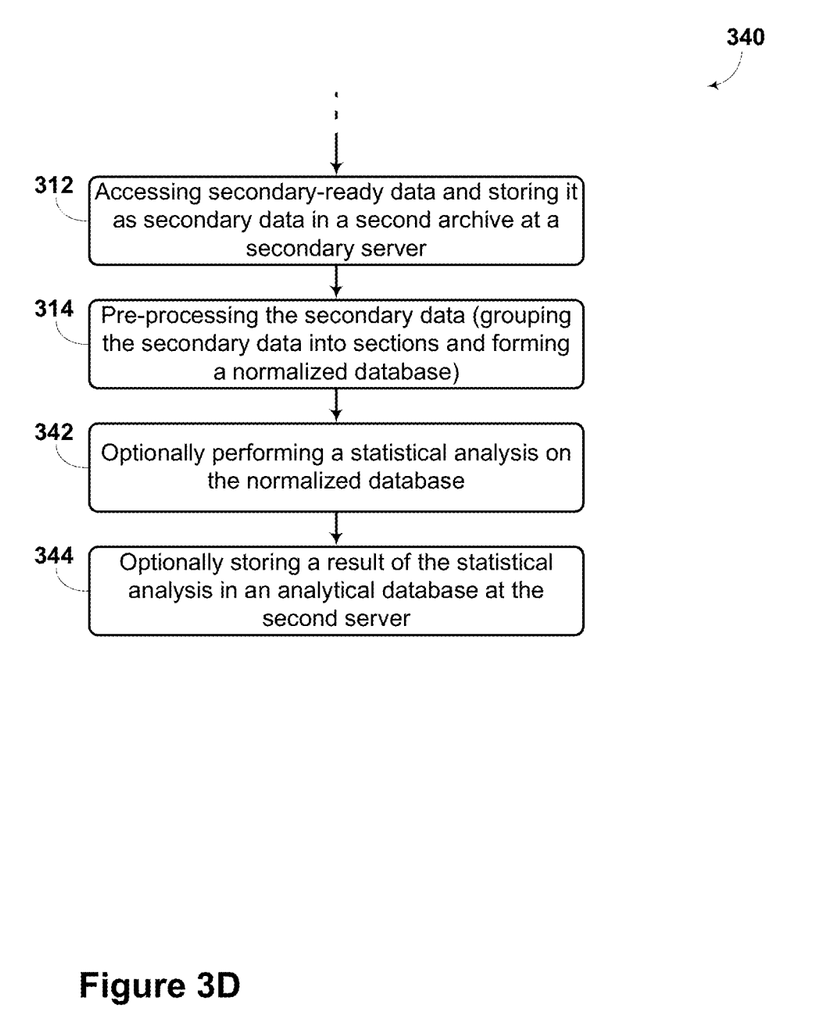
FIG. 3D is a flow diagram illustrating a method, according to an example embodiment.

FIG. 3D is a flow diagram illustrating a method 340, according to an example embodiment. In some aspects, method 340 may be similar or identical to the aforementioned methods. Block 342 includes optionally performing a statistical analysis on the normalized database.

Block 344 includes optionally storing a result of the statistical analysis in an analytical database at the secondary server.

Figure 4:
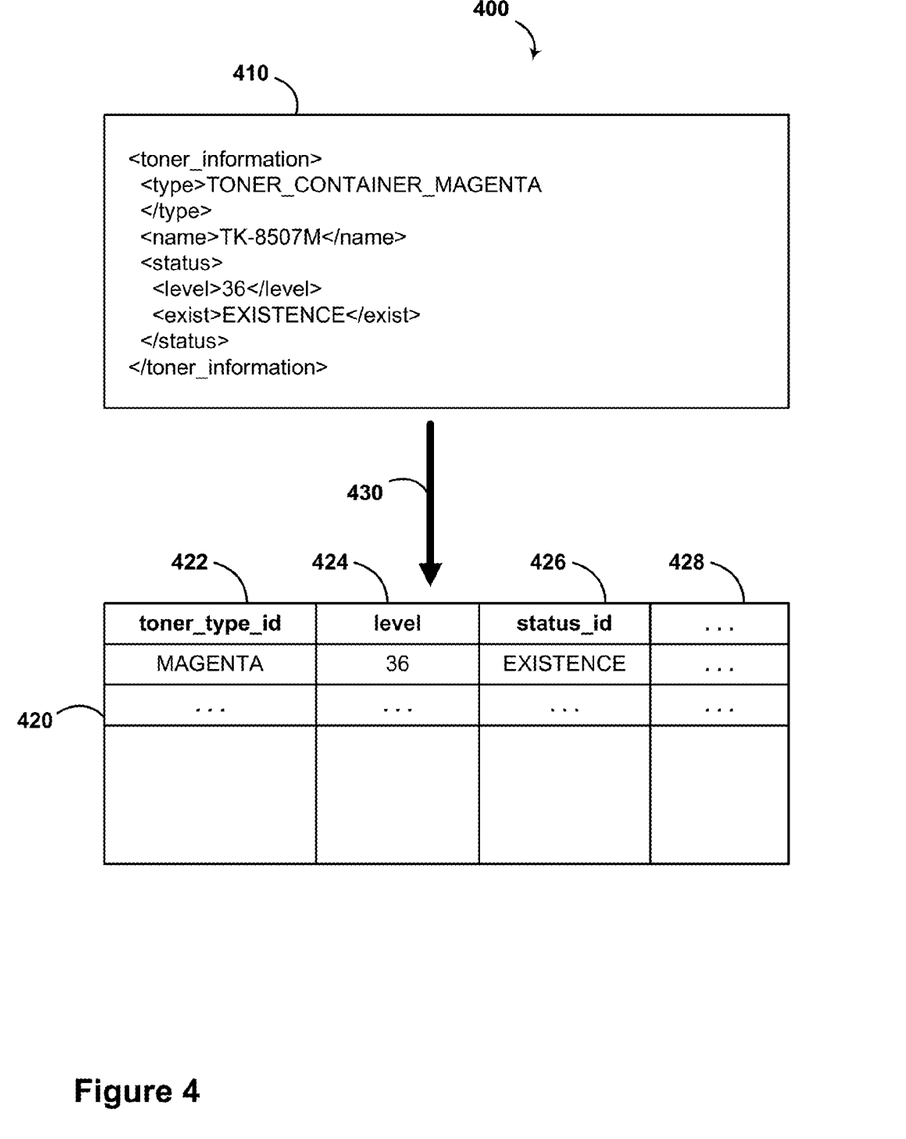
FIG. 4 is a schematic block diagram illustrating a method of pre-processing, according to an example embodiment.

FIG. 4 is a schematic block diagram illustrating a method of pre-processing 400, according to an example embodiment. The method of pre-processing 400 may relate to method blocks described herein, such as Block 314 of method 300. Pre-processing may occur elsewhere within the methods described herein.

A data transmission with an original format 410 may be received by the primary server. The data transmission may be formatted according to XML, plain text, or comma-spaced value (CSV) formats. Other original formats are possible. The data transmission with an original format 410 may be pre-processed 430 by a processor associated with the secondary server. The pre-processed data transmission 420 may include various sections, fields, or other organizational attributes common to similar pre-processed data transmissions. For example, the pre-processed data transmission 420 may include a toner_type_id 422, a level 424, a status_id 426, and other information 428. In this scenario, the toner_type_id 422 may be MAGENTA, the level 424 may be 36 (e.g. 36% of full level), and the status_id 426 may be EXISTENCE. Additionally or alternatively, other information may be present in the pre-processed data transmission 420. In an example embodiment, the pre-processed data transmission 420 may be organized so as to be more easily searched, manipulated, or otherwise useful. As discussed above, in some embodiments, the pre-processed secondary data may be subject to a statistical analysis based on the organization of the pre-processed data transmission 420 and its information content.

Figure 5:
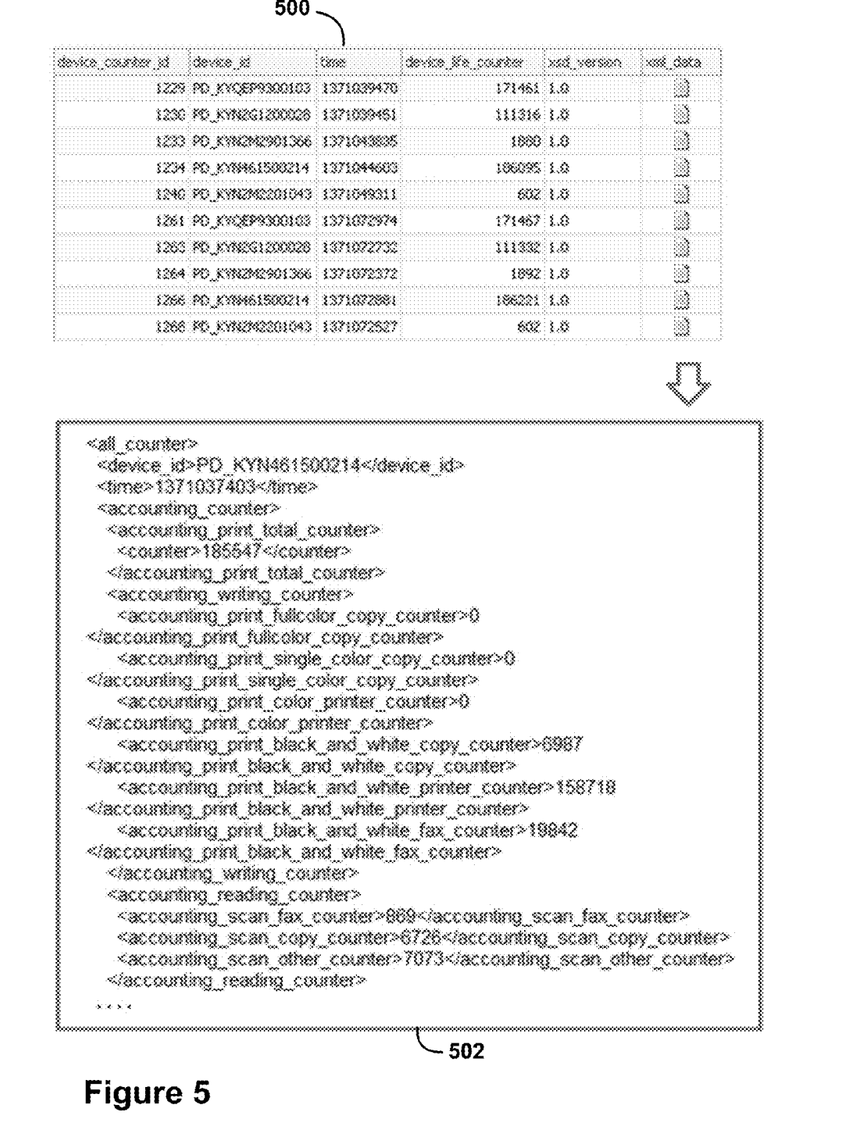
FIG. 5 is a schematic block diagram illustrating a file listing and an XML-formatted data transmission, according to an example embodiment.

FIG. 5 is a schematic block diagram illustrating a file listing 500 and an XML-formatted data transmission 502, according to an example embodiment. The file listing 500 may represent a partial listing of data transmissions stored at the primary server or at the secondary server. As illustrated, the file listing 500 may include a plurality of fields, such as a device identifier (device_id) field, a time field, a device_life_counter field, a software version (xsd_version) field, an XML data field, and a file creation time (create_time) field.

As illustrated, the XML-formatted data transmission 502 corresponds to the second entry in the file listing 500. However, each entry may correspond to a different XML-formatted data transmission or, more generally, a data transmission with differently formatted information. The XML-formatted data transmission 502 may include information such as a device identifier (device_id), a time, a total print page counter, and various other page counters that may represent pages printed in respective printing modes of the printing device. Although the illustrated example includes page count information about a respective printing device, other data transmissions may provide information related to other aspects of the printing device.

Figure 6:
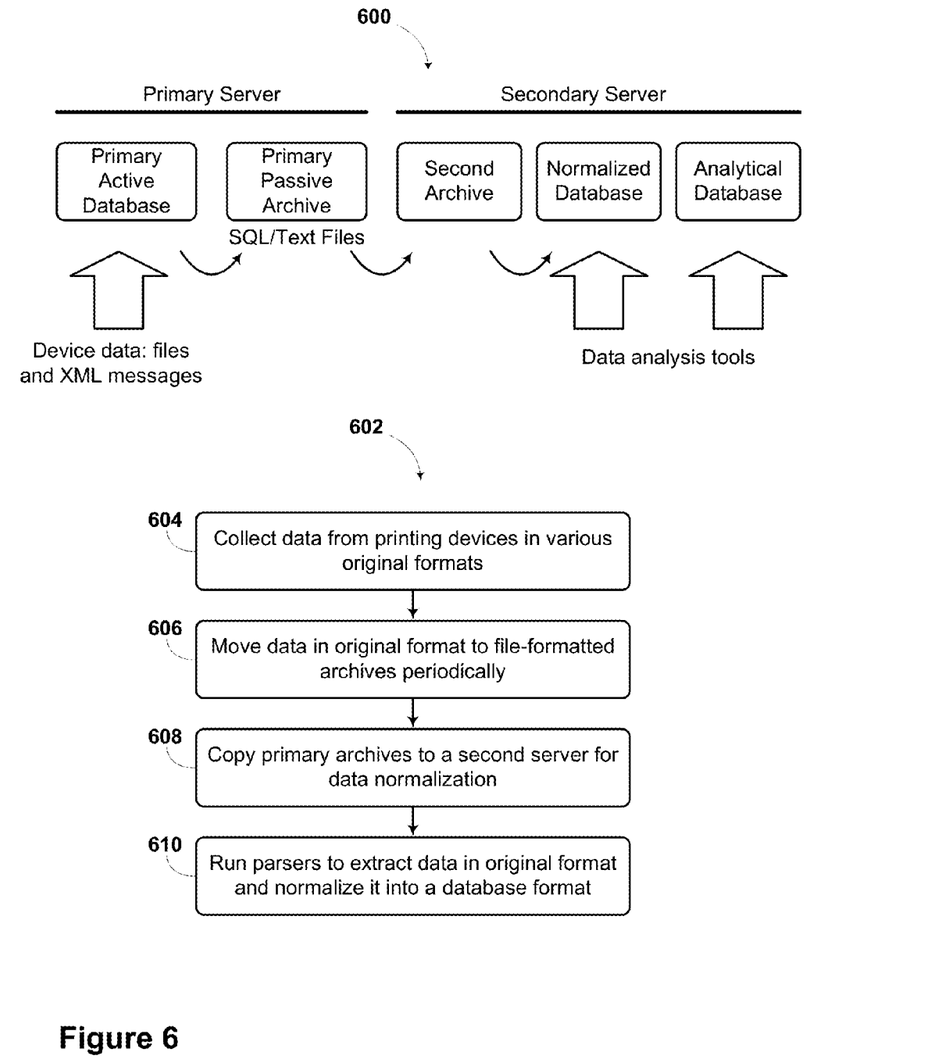
FIG. 6 is a block diagram and associated flow diagram illustrating a system and method, according to an example embodiment.

FIG. 6 is a block diagram 600 and associated flow diagram illustrating a system and method 602, according to an example embodiment. The block diagram 600 and system and method 602 may include similar or identical elements as described in reference to system 100, method 300, and method 400. Block diagram 600 includes a primary server and a secondary server. The primary server may include a primary active database and a primary passive archive. The secondary server may include a second archive, a normalized database, and an analytical database. As illustrated, block diagram 600 may include the primary active database receiving device data, such as files and XML messages. Such device data (or data transmissions) may be formatted according to an original format and may be stored in the primary active database in their respective original formats. Upon aging beyond a threshold, device data may be stored in the primary passive archive while still in the respective original format. The archived data in the primary passive archive may be transferred to the second archive associated with the secondary server and stored there while still in the respective original format. Thereafter, the device data in the second archive may be parsed, modified, arranged, or otherwise adjusted to conform to a format of the normalized database. That is, entries in the normalized database may include a similar or common format type. Some or all information from the normalized database may be optionally transferred or stored in the analytical database.

Data analysis tools may be applied to the information stored in the normalized database and the analytical database. The data analysis tools may help identify trends or patterns with regards to printing devices, shared hardware, or other aspects of the data transmissions. The data analysis tools may also allow for data queries and/or searches within the respective databases. Generally, the data analysis tools may help to identify useful information about the printing devices based on a large number of data transmissions.

Method 602 describes blocks that may be carried out in reference to block diagram 600. The blocks may be carried out in any order and blocks may be added or removed. Block 604 includes collecting data from printing devices in various original formats. For example, a primary server may receive a plurality of data transmissions from a corresponding plurality of printing devices. Receiving the data transmissions may be similar or identical to block 302, described in reference to FIG. 3A. The data transmissions may include a variety of different original file formats. Block 606 includes periodically moving the data in its original format to file-formatted archives. Moving the data to file-formatted archives may be similar or identical to block 304, described in reference to FIG. 3A. Block 608 includes copying the primary archives to the second server in preparation for data normalization. Copying the primary archives to the second server may include storing archive-ready data in a passive archive at the primary server as archive data as described in block 308, described in reference to FIG. 3A. Block 610 includes running parsers to extract data from the original format and normalize it into the database format. Running parsers may include pre-processing the secondary data similarly or identically to block 314, described in reference to FIG. 3A.

While various examples and embodiments have been disclosed, other examples and embodiments will be apparent to those skilled in the art. The various disclosed examples and embodiments are for purposes of illustration and are not intended to be limiting, with the true scope and spirit being indicated by the following claims.

What is claimed is:

1. A method comprising:
  receiving, at a primary server, a plurality of data transmissions from a corresponding plurality of printing devices, wherein the plurality of data transmissions comprises respective data transmissions, and wherein each respective data transmission is formatted according to an original format and wherein each respective data transmission comprises a respective device identifier;
  storing the respective data transmissions in an active database associated with the primary server, wherein storing the respective data transmissions comprises storing the respective data transmissions in the respective original formats;
  determining archive-ready data from the stored data transmissions based on a timestamp being beyond a threshold;
  storing the archive-ready data as accumulated archive data in a passive archive associated with the primary server;

determining secondary-ready data from the accumulated archive data based on a size of the accumulated archive data;

transferring the secondary-ready data from the primary server to a secondary server;

storing the secondary-ready data as secondary data in a second archive associated with the secondary server; and pre-processing the secondary data, wherein pre-processing the secondary data comprises:

grouping the secondary data into sections based at least on a respective printing device property of the respective data transmissions of the secondary data; and forming a normalized database comprising the sections organized based at least on the respective device identifiers of the respective data transmissions of the secondary data.

2. The method of claim 1 wherein transferring the secondary-ready data from the primary server to the secondary server comprises the secondary server accessing the secondary-ready data on the primary server and wherein storing the secondary-ready data as secondary data in the second archive associated with the secondary server comprises the secondary server storing the secondary-ready data as secondary data in the second archive associated with the secondary server.

3. The method of claim 1 wherein transferring the secondary-ready data from the primary server to the secondary server comprises the primary server transferring the secondary-ready data to the secondary server and wherein storing the secondary-ready data as secondary data in the second archive associated with the secondary server comprises the secondary server storing the secondary-ready data as secondary data in the second archive associated with the secondary server.

4. The method of claim 1 wherein receiving the plurality of data transmissions further comprises receiving the respective data transmissions at an average daily rate of at least 1000 respective data transmissions per day.

5. The method of claim 1 wherein determining secondary-ready data comprises the size of the accumulated archive data being above a threshold size.

6. The method of claim 1 further comprising compressing the accumulated archive data.

7. The method of claim 6 further comprising decompressing the secondary data.

8. The method of claim 1 further comprising storing primary metadata based on the respective data transmissions, wherein the primary metadata comprises respective file names and respective file locations of the respective data transmissions within the stored data transmissions.

9. A method comprising:

receiving, at a primary server, a plurality of data transmissions from a corresponding plurality of printing devices, wherein the plurality of data transmissions comprises respective data transmissions, and wherein each respective data transmission is formatted according to an original format and wherein each respective data transmission comprises a respective device identifier;

storing the respective data transmissions in an active database associated with the primary server, wherein storing the respective data transmissions comprises:

storing the respective data transmissions in the respective original formats; and storing primary metadata based on the stored data transmissions;

receiving, at the primary server, a repair query, wherein the repair query comprises at least one search criteria based on the primary metadata;

determining a query response, wherein the query response comprises respective data transmissions from the stored data transmissions that correspond to the at least one search criteria;

transmitting the query response;

determining archive-ready data from the stored data transmissions based on a timestamp being beyond a threshold;

storing the archive-ready data as accumulated archive data in a passive archive associated with the primary server;

determining secondary-ready data from the accumulated archive data based on a size of the accumulated archive data;

transferring the secondary-ready data from the primary server to a secondary server;

storing the secondary-ready data as secondary data in a second archive associated with the secondary server; and pre-processing the secondary data, wherein pre-processing the secondary data comprises:

grouping the secondary data into sections based at least on a respective printing device property of the respective data transmissions of the secondary data; and forming a normalized database comprising the sections organized based at least on the respective device identifiers of the respective data transmissions of the secondary data; and performing a statistical analysis on the normalized database based on at least one section.

10. The method of claim 9 wherein transferring the secondary-ready data from the primary server to the secondary server comprises the secondary server accessing the secondary-ready data on the primary server and wherein storing the secondary-ready data as secondary data in the second archive associated with the secondary server comprises the secondary server storing the secondary-ready data as secondary data in the second archive associated with the secondary server.

11. The method of claim 9 wherein transferring the secondary-ready data from the primary server to the secondary server comprises the primary server transferring the secondary-ready data to the secondary server and wherein storing the secondary-ready data as secondary data in the second archive associated with the secondary server comprises the secondary server storing the secondary-ready data as secondary data in the second archive associated with the secondary server.

12. The method of claim 9 wherein receiving the plurality of data transmissions further comprises receiving the respective data transmissions at an average daily rate of at least 1000 respective data transmissions per day.

13. The method of claim 9 wherein determining secondary-ready data comprises the size of the accumulated archive data being above a threshold size.

14. The method of claim 9 further comprising compressing the accumulated archive data.

15. The method of claim 14 further comprising decompressing the secondary data.

16. The method of claim 9 wherein the primary metadata comprises respective file names and respective file locations of the respective data transmissions within the stored data transmissions.

17. The method of claim 9 further comprising storing a result of the statistical analysis in an analytical database associated with the secondary server.

18. A system comprising:

a primary server comprising a primary processor and a primary storage device; and a secondary server comprising a secondary processor and a secondary storage device, wherein the primary processor is configured to:
  receive a plurality of data transmissions from a corresponding plurality of printing devices, wherein the plurality of data transmissions comprises respective data transmissions, and wherein each respective data transmissions is formatted according to an original format and wherein each respective data transmissions comprises a respective device identifier;
  store the respective data transmissions in an active database associated with the primary storage device, wherein storing the respective data transmissions comprises storing the respective data transmissions in the respective original formats;
  store primary metadata based on the stored data transmissions, wherein the primary metadata comprises respective file names and respective file locations of the respective data transmissions within the stored data transmissions;
  determine archive-ready data from the stored data transmissions based on a timestamp being beyond a threshold;
  store the archive-ready data as accumulated archive data in a passive archive associated with the primary storage device;
  determine secondary-ready data from the accumulated archive data based on a size of the accumulated archive data; and
  transfer the secondary-ready data from the primary server to a secondary server; and wherein the secondary processor is configured to:
  store the secondary-ready data as secondary data in a second archive associated with a secondary storage device; and
  pre-process the secondary data, wherein pre-processing the secondary data comprises:
    grouping the secondary data into sections based at least on a respective printing device property of the respective data transmissions of the secondary data; and
    forming a normalized database comprising the sections organized based at least on the respective device identifiers of the respective data transmissions of the secondary data.

19. The system of claim 18 wherein the primary server is further configured to:
  receive, at the primary server, a repair query, wherein the repair query comprises at least one search criteria based on the primary metadata;
  determine a query response, wherein the query response comprises respective data transmissions from the stored data transmissions that correspond to the at least one search criteria; and
  transmit the query response.

20. The system of claim 18 wherein the secondary server is further configured to perform a statistical analysis on the normalized database based on at least one section and store a result of the statistical analysis in an analytical database associated with the secondary server.

* * * * *